R. B. PHILLIPS.
ELEVATED CARRIER.
APPLICATION FILED APR. 1, 1913.
1,144,060.
Patented June 22, 1915.
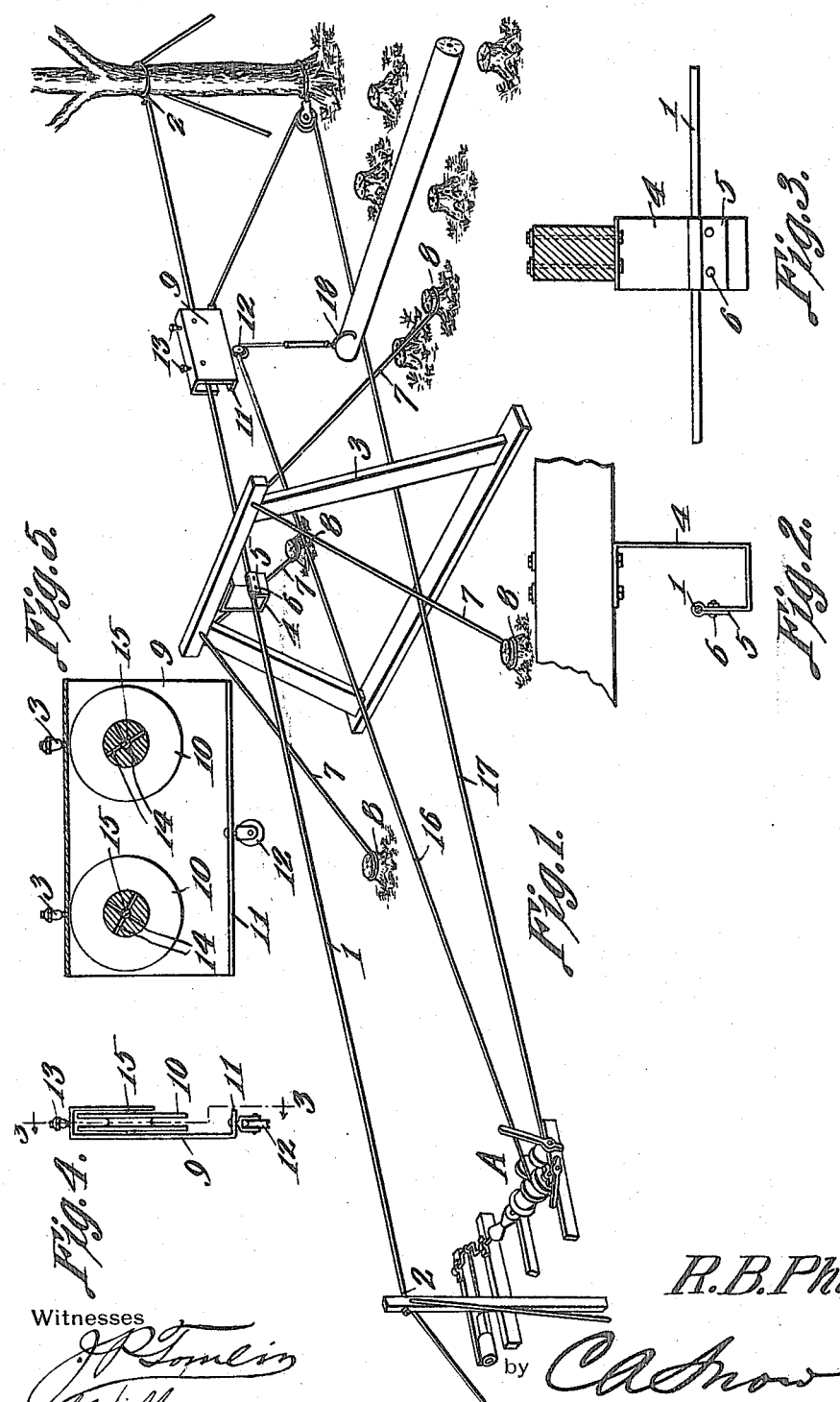
R.B.Phillips,
Inventor
Witnesses
by
Attorneys

UNITED STATES PATENT OFFICE.

ROBERT B. PHILLIPS, OF DUBLIN, NORTH CAROLINA.

ELEVATED CARRIER.

1,144,060.

Specification of Letters Patent.  Patented June 22, 1915.

Application filed April 1, 1913.  Serial No. 758,207.

*To all whom it may concern:*

Be it known that I, ROBERT B. PHILLIPS, a citizen of the United States, residing at Dublin, in the county of Bladen and State of North Carolina, have invented a new and useful Elevated Carrier, of which the following is a specification.

My invention relates to new and useful improvements in an elevated carrier and more particularly to a device of this character used in logging.

It has for its object the provision of a device of this character which can be used for transporting logs for a long distance and means for supporting the cable in such a manner that the cable can be carried through densely growing forests.

It has for its further object means for oiling the cable to make the operation of the carriage thereon easy and the preserving of the life of the cable.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 is a perspective. Fig. 2 is an end view of the cable support. Fig. 3 is a side view of the cable support. Fig. 4 is an end view of the carriage. Fig. 5 is a longitudinal sectional view of the carriage.

In the drawings, the numeral 1 indicates the cable which may be secured at the ends 2 to any suitable support.

Intermediate the ends may be placed any number of frames 3 to the upper cross bars of which are secured the cable supports 4 having the removable plates 5 for securely gripping the cable. These plates are secured to the supports 4 by means of the bolts 6. The frames 3 are securely held in position by means of the guy wires 7 which may be secured to stumps as indicated at 8.

A carriage 9 having the wheels 10 journaled therein operates on the cable 1 and as will be seen in the drawings this carriage is provided with the bottom flange 11 to which is secured the pulley, 12. Oil cups 13 are provided on the top of the carriage and the oil dropping therefrom passes through the openings 14 formed in the hub of the wheel to the axle 15. By this means oil will also be conveyed to the cable 1 which will allow the carriage to pass freely thereover and at the same time preserve the life of the cable.

For operating the carriage I provide the usual engine and drums as indicated at A, and secured to one of the drums is the cable 16 and to the other drum the cable 17. The cable 16 passes over the pulley 12 secured to the carriage and on the end of the cable are the usual grapple hooks indicated at 18.

Having described the several parts of the invention it is thought that the operation will be clearly understood. When the engine is operated the cable 16 is wound upon its drum and raises the end of the log which is engaged by the grapple hook and at the same time draws the carriage over the cable. The cable 17 is used for returning the carriage to the opposite end. It will be noted that the oil dropping from the cups 13 will pass onto the hub of the wheel on the carriage and will thereby oil the cable 1 as well as pass through the holes 14 onto the wheel axle.

Having fully described my invention what I claim and desire to secure by Letters Patent is:—

The combination with a supporting cable and supporting means therefor embracing a portion of the cable, of means for lubricating the cable and the supporting means, said lubricating means including a carriage, an axle extending transversely within the carriage, and a grooved wheel journaled on the axle and straddling the cable, the cable engaging hub portion of the wheel being formed with radial openings extending from the center of the wheel to the periphery of the hub, and means for directing a lubricant upon the periphery of the hub from the upper portion of the carriage.

In testimony that I claim the foregoing as my own, I have hereto affixed my signature in the presence of two witnesses.

ROBERT B. PHILLIPS.

Witnesses:
SELINA WILLSON,
J. P. CAMPBELL.

Copies of this patent may be obtained for five cents each, by addressing the "Commissioner of Patents, Washington, D. C."